(12) United States Patent
Sheil

(10) Patent No.: US 11,987,349 B2
(45) Date of Patent: May 21, 2024

(54) ROTATABLE NACELLE FOR CENTRIFUGAL FAN ON AIRCRAFT

(71) Applicant: Jerrold Joseph Sheil, Burlington, IA (US)

(72) Inventor: Jerrold Joseph Sheil, Burlington, IA (US)

( * ) Notice: Subject to any disclaimer, the term of this patent is extended or adjusted under 35 U.S.C. 154(b) by 38 days.

(21) Appl. No.: 17/302,013

(22) Filed: Apr. 21, 2021

(65) Prior Publication Data

US 2021/0331792 A1   Oct. 28, 2021

Related U.S. Application Data

(60) Provisional application No. 63/101,272, filed on Apr. 22, 2020.

(51) Int. Cl.
*B64C 29/00* (2006.01)

(52) U.S. Cl.
CPC ................................ *B64C 29/0016* (2013.01)

(58) Field of Classification Search
CPC . B64C 29/0016; B64C 29/0041; B64C 15/12; B64C 39/064; B64C 39/001; F04D 17/00
See application file for complete search history.

(56) References Cited

U.S. PATENT DOCUMENTS

| | | | |
|---|---|---|---|
| 2,774,554 A * | 12/1956 | Ashwood | B64C 29/0066 239/265.29 |
| 2,814,451 A | 11/1957 | Turner et al. | |
| 3,312,386 A * | 4/1967 | Hull | F04D 17/165 415/214.1 |
| 5,046,684 A | 9/1991 | Wolkovitch | |
| 5,054,716 A | 10/1991 | Wilson | |
| 5,765,783 A | 6/1998 | Albion | |
| 8,800,912 B2 | 8/2014 | Oliver | |
| 9,377,784 B2 | 6/2016 | Kowalski et al. | |
| 9,598,169 B1 | 3/2017 | LeGrand, III et al. | |
| 10,486,806 B2 | 11/2019 | Alber | |
| 10,513,332 B2 | 12/2019 | Alber et al. | |
| 10,710,713 B2 | 7/2020 | Mia | |
| 11,142,308 B2 * | 10/2021 | Bucheru | B60V 3/08 |
| 11,180,243 B2 * | 11/2021 | Stone | B64D 29/02 |
| 11,332,241 B2 * | 5/2022 | Gonzalez | B64C 29/0016 |

(Continued)

FOREIGN PATENT DOCUMENTS

WO    WO-2017187214 A1 *  11/2017

OTHER PUBLICATIONS

Sheperd, Samm, "This is NOT a Propeller", YouTube, posted Dec. 27, 2015; downloaded from https://youtube.com/watch?v=wg8ZbiC9IBw on Mar. 14, 2021.

*Primary Examiner* — Richard Green
*Assistant Examiner* — Arfan Y. Sinaki
(74) *Attorney, Agent, or Firm* — McKee, Voorhees & Sease, PLC

(57) ABSTRACT

An aircraft achieves vertical takeoff and landing and short takeoff and landing capabilities by transitioning the thrust created by a super charged centrifugal fan from a vertical launch position to a horizontal cruise position for a resulting propulsion effect. Neither the rotors or the engines included on the aircraft have to move or rotate into a distinct position in order to provide such vertical takeoff and landing and short takeoff and landing capabilities.

12 Claims, 8 Drawing Sheets

(56) References Cited

U.S. PATENT DOCUMENTS

| | | | | |
|---|---|---|---|---|
| 2012/0234968 | A1* | 9/2012 | Smith | B64C 29/0033 |
| | | | | 244/12.3 |
| 2017/0233069 | A1* | 8/2017 | Apkarian | B64F 5/10 |
| | | | | 244/7 R |
| 2018/0044012 | A1* | 2/2018 | Groninga | F04D 17/04 |
| 2018/0044013 | A1* | 2/2018 | Groninga | B64C 15/12 |
| 2019/0382110 | A1* | 12/2019 | Cottrell | B64C 29/0025 |
| 2020/0207468 | A1* | 7/2020 | Bucheru | B64C 29/0033 |
| 2020/0307767 | A1* | 10/2020 | Greenberg | B64C 11/001 |
| 2020/0385104 | A1* | 12/2020 | Stone | B64C 11/20 |
| 2021/0276708 | A1* | 9/2021 | Gonzalez | B64C 15/12 |
| 2021/0316852 | A1* | 10/2021 | Gonzalez | B64C 39/08 |
| 2022/0106034 | A1* | 4/2022 | Bucheru | B60V 3/08 |
| 2022/0169379 | A1* | 6/2022 | Sharifzadeh | F02K 1/006 |

* cited by examiner

ROTATABLE NACELLE FOR CENTRIFUGAL FAN ON AIRCRAFT

CROSS REFERENCE TO RELATED APPLICATIONS

This application claims priority under 35 U.S.C. § 119 to provisional patent application U.S. Ser. No. 63/101,272, filed Apr. 22, 2020. The provisional patent application is herein incorporated by reference in its entirety, including without limitation, the specification, claims, and abstract, as well as any figures, tables, appendices, or drawings thereof.

FIELD OF THE INVENTION

The present invention relates generally to an apparatus and/or corresponding method of use in at least the aerospace industry. More particularly, but not exclusively, the present invention relates to a rotatable nacelle for a centrifugal fan on an aircraft.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Traditional vertical takeoff and landing (VTOL) and short takeoff and landing (STOL) aircraft are inherently unstable. The inherent instability comes from disrupting with an external torque, the naturally stable position of the rotating object (propeller), which has massive angular momentum during rotation.

The effects that must be mitigated can be analogized to the more well-known effects that occur from spinning a bicycle wheel at a rotational high speed and then adding weight to an axial member traversing the center of the wheel. The tilt caused by the added weight will subsequently cause the spinning wheel to undergo gyroscopic precession, resulting in the spinning wheel to rotate about a second axis. If secondary rotation were not permitted, and instead the axial member were mechanically connected to another object were introduced, the components of the bicycle wheel assembly could fail.

Traditional vertical takeoff and landing (VTOL) and short takeoff and landing (STOL) thus often crash because they require extreme manipulation of torque to reposition thrust from a vertical force to a propelling horizontal force while the propeller is rotating at a high speed. As an example, the Bell Boeing V-22 Osprey is an American military tiltrotor aircraft with an accident history that has generated some controversy over its perceived safety due to these very issues. The more modern Bell V-280 Valor attempts to reduce the effects of these issues by rotating only the rotors during transition from a lift configuration to a thrust configuration, instead of rotating both the rotors and the engine.

Other developments in this technological field have also relied on tilt-rotor configurations to achieve similar objectives. For example, U.S. Pat. No. 10,710,713, which is owned by Pegasus Universal Aviation, discloses a vertical takeoff and landing jet with a fuselage that accommodates a tilt-rotor design. The tilt-rotor design includes a tilt-rotor movable between a vertical position providing lift for vertical takeoff and a forward position providing thrust during cruise.

Thus, there exists a need in the art for an aircraft with vertical takeoff and landing and/or short takeoff and landing capabilities capable of transitioning from a vertical launch position to a horizontal cruise position without having to move or tilt rotors and/or the engine into a distinct position(s)/orientation(s).

Centrifugal fans generally comprise an impeller (a type of rotor) mounted on a shaft that rotates in a scroll-shaped housing. Air enters at the eye of the rotor, makes a right-angle turn, and is forced through the blades of the rotor by centrifugal force into the scroll-shaped housing. The centrifugal force imparts static pressure to the air. The diverging shape of the scroll also converts a portion of the velocity pressure into static pressure. Centrifugal fans are commonly used to move contaminated air (e.g., air with sawdust) from a dust-producing source to a dust collector, in blower heaters, vacuum cleaners, and water pumps.

As demonstrated by the late American inventor Sammuel Sheperd, centrifugal fans can be used to power very light-weight aircraft. Mr. Sheperd was able to fly a model plane he built out of foamboard and a blower motor taken from an old heater. Mr. Sheperd integrated the blower model into the fuselage of a remote control ("RC") plane with the centrifugal fan pointed to blow air aftward. To get the plane to takeoff, Mr. Sheperd holds the model aircraft roughly four feet off the ground and tosses the plane forward. Thereafter, Mr. Sheperd appears to have complete remote control over the model plane, caused in part by the plane's actuatable ailerons and elevators. Mr. Sheperd asserts in his video he believes he was the first to use centrifugal fans as the primary mechanism to provide thrust for the aircraft. Mr. Sheperd notes that his design was "crude and not nearly as efficient as a propeller." Unfortunately Mr. Sheperd has since passed away, and so there exists a great need in the art for those inspired by his work to apply, further develop, and ultimately optimize his creative solutions to solve other problems facing the art.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art. For example, an aircraft can avoid the issues that are common the V-22 Osprey and V-280 Valor but still provide for vertical landing and takeoff through use of two centrifugal fans. The centrifugal fan remains in a stationary position while only the rotating ductwork encompassing the fans rotates. The rotating ductwork preferably rotates at least ninety (90) degrees. The rotation of the ductwork is preferably manually controlled by a remote operator of the plane, a pilot in the cockpit, and/or controlled by an auto-pilot. Functionality of wing, fan, and nacelle combinations described herein should not impede functionality of other avionics equipment of the aircraft.

An aspirational object, feature, and/or feature of the present invention is to increase the use of air taxis through-out the world. It is thus envisioned, albeit not required, that the present invention be implemented on ultralight airplanes. Such airplanes could include private planes, remote control planes, drones, and the like. Some commercial aircraft could still stand to benefit by incorporating this concept.

It is a further object, feature, and/or advantage of the present invention to produce a byproduct flywheel effect via the high speed rotating mechanical apparatus so as to provide stability for the airframe while airborne. For example, it is desirable to always maintain any propeller(s) on the aircraft in a constant, upright position.

It is still yet a further object, feature, and/or advantage of the present invention to provide a centrifugal supercharger whose energy is most efficiently harnessed by a compatible airframe for both thrust and lift. For example, the centrifugal supercharger is preferably capable of discharging cool, dense air so as to achieve greater efficiencies.

Alternatively, the aircraft engine can be self fed using its own vacuum, and the vacuum can also be used to simultaneously drive gyroscopes incorporated on the aircraft.

It is still yet a further object, feature, and/or advantage of the present invention to increase oxygen intake into the engine and/or reduce the engine's necessary fuel consumption rate during operation.

It is still yet a further object, feature, and/or advantage of the present invention to power an aircraft having the wing, fan, and nacelle assemblies discussed herein with an internal combustion engine or an electric motor.

The rotatable nacelle disclosed herein can be used in a wide variety of applications. For example, the rotatable nacelle could be used to divert and/or harness energy created by fluids other than air or be implemented in systems other than aircraft. In some embodiments, the nacelle can be adapted so as to take in air from two directions and output air in a single direction.

It is still yet a further object, feature, and/or advantage of the present invention to allow the aircraft to be able to land in either the thrust configuration (e.g. on a runway) or in a lift configuration (e.g. vertical landing).

The rotatable nacelle(s) and corresponding centrifugal fan(s) described herein can be the primary means for which the aircraft can produce both thrust and lift. Alternatively, the nacelle (s) and fan(s) combination can be used in addition to other thrust/lift producing components on the aircraft.

It is preferred the wing, fan, and nacelle assemblies discussed herein be safe, cost effective, and durable. For example, it is preferred there is minimal exposure to engine detonation. In yet another example, large amounts of torque between any propeller(s) and the aircraft should be eliminated.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention.

Methods can be practiced which facilitate use, manufacture, assembly, maintenance, and repair of a rotatable nacelle which accomplish some or all of the previously stated objectives. In some embodiments, the nacelles include a removable cowling that allows direct access to the blades or vanes of the impeller without having to remove the radial or the axial casing of the impeller housing.

The rotatable nacelle can be incorporated into systems which accomplish some or all of the previously stated objectives. For example, the rotatable nacelle and the corresponding centrifugal fan can be positioned at the end of an aircraft wing. Furthermore, said wing, fan, and nacelle combinations can be self-contained.

According to some other aspects of the present disclosure, a method of providing lift and/or thrust for an aircraft comprises utilizing nacelles at a port end and a starboard end of wings of the aircraft, each nacelle comprising a centrifugal fan housed within an impeller casing, said centrifugal fan comprising blades or vanes; powering the centrifugal fan with rotors and a motor; allowing fluid to enter the nacelle in a substantially axial direction through a centralized intake port locating on a sidewall of the impeller casing; accelerating the fluid with a centrifugal force caused by rotation of the blades or vanes; and discharging the fluid through an outlet formed in a circumferential wall of the impeller casing in a substantially radial direction oriented approximately ninety degrees from the substantially axial direction.

According to some additional aspects of the present disclosure, wings of the aircraft can utilize airfoils defined by a trailing edge, a leading edge, a chord traversing the direct distance from the leading edge and the trailing edge of the airfoil, and a camber line that creates a positive aerodynamic camber. In some embodiments, especially those wherein the aircraft does not include a tailplane, the camber line is a reflexed camber line.

According to some additional aspects of the present disclosure, trim tabs, such as ailerons, elevators, and rudders can be utilized by the aircraft.

According to some additional aspects of the present disclosure, the aircraft will include landing gear located at an undercarriage of the fuselage with wheels that aid during takeoff and landing.

According to some additional aspects of the present disclosure, weaponry, also known as aircraft ordnance, may be included on the aircraft.

According to some additional aspects of the present disclosure, the radial casing, the axial casing, and/or the wing may be coupled to each other via one or more fasteners, such as screws, nuts, bolts, pins, rivets, staples, washers, grommets, latches (including pawls), ratchets, clamps, clasps, flanges, ties, adhesives, welds, and any combination thereof.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

An artisan of ordinary skill need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
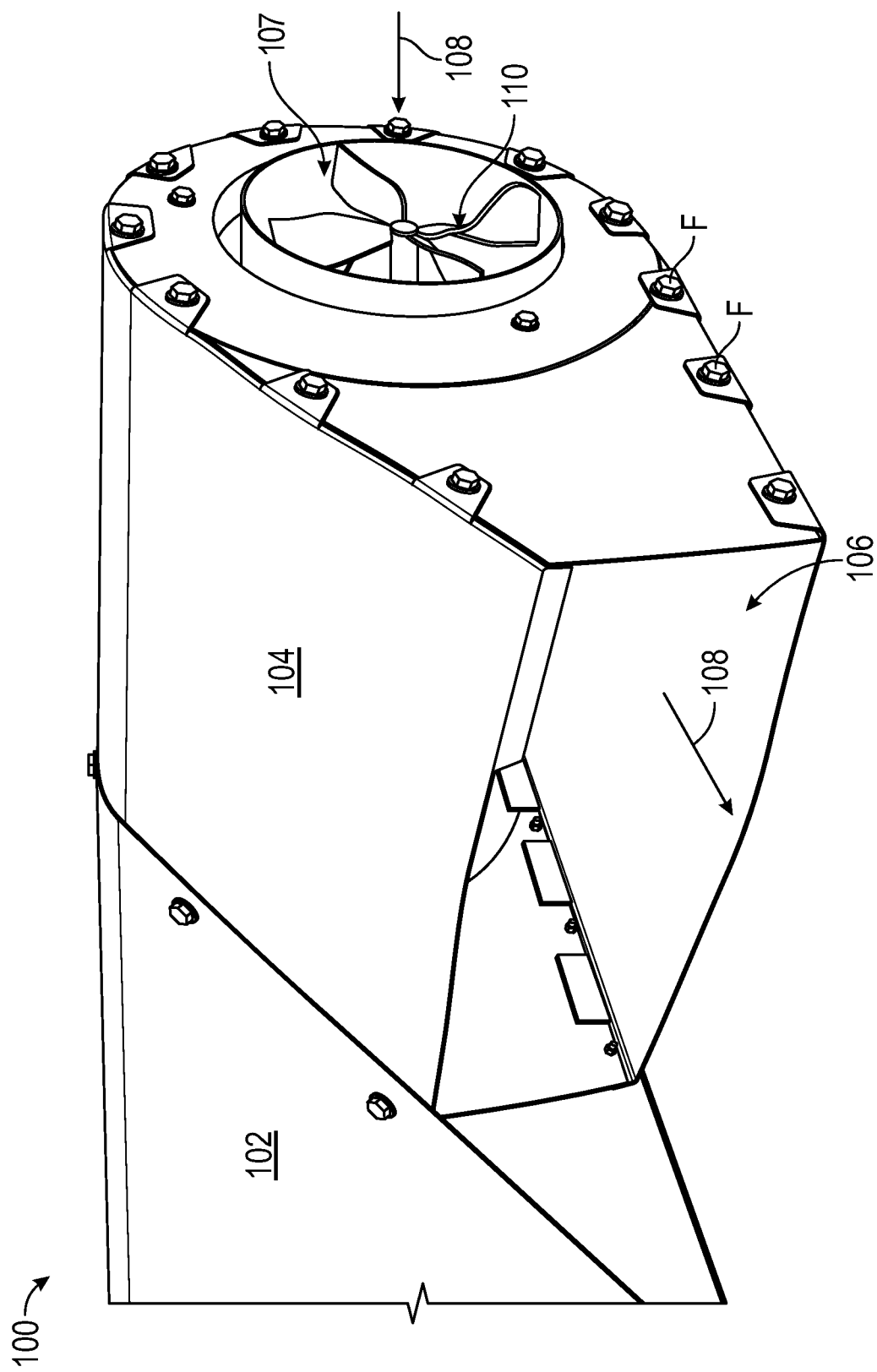
FIG. 1 shows a detailed, aft perspective view of a wing, fan, and nacelle assembly, according to some aspects of the present disclosure.

Referring now to the figures, an aircraft 98 can be equipped with a self-contained wing, fan, and nacelle assembly 100, as shown in FIG. 1. The wing, fan, and nacelle assembly 100 is shown including the wing 102, nacelle 104, fan 110. When operated, the fan 110 and nacelle allow air to enter the nacelle 104, turn approximately ninety degrees, and exit the nacelle 104 via a discharge nozzle 106. The nacelle 104 is preferably rotatable.

The wing 102 acts as a type of fin that produces lift while moving through air or some other fluid. The wing 102 can be defined by a trailing edge 112, a leading edge 114, a chord 116 joining the leading edge 114 and the trailing edge 112 of the airfoil, and a camber line 118 that creates a positive aerodynamic camber. Accordingly, the wing 102 will ideally have a streamlined cross-section (camber 118) that, when subject to aerodynamic forces, optimizes a lift-to-drag ratio (aerodynamic efficiency) ideal for its given application. For example, the lift the wing 102 generates at a given speed and angle of attack can be one to two orders of magnitude greater than the total drag on the wing 102. A high lift-to-drag ratio requires a significantly smaller thrust to propel the wings through the air at sufficient lift. The wing 102 is shown as a fixed wing that can be used to fly heavier-than-air flying machines, such as aircraft 98, though it is to be appreciated other types of wings could thus be used.

Figure 2:
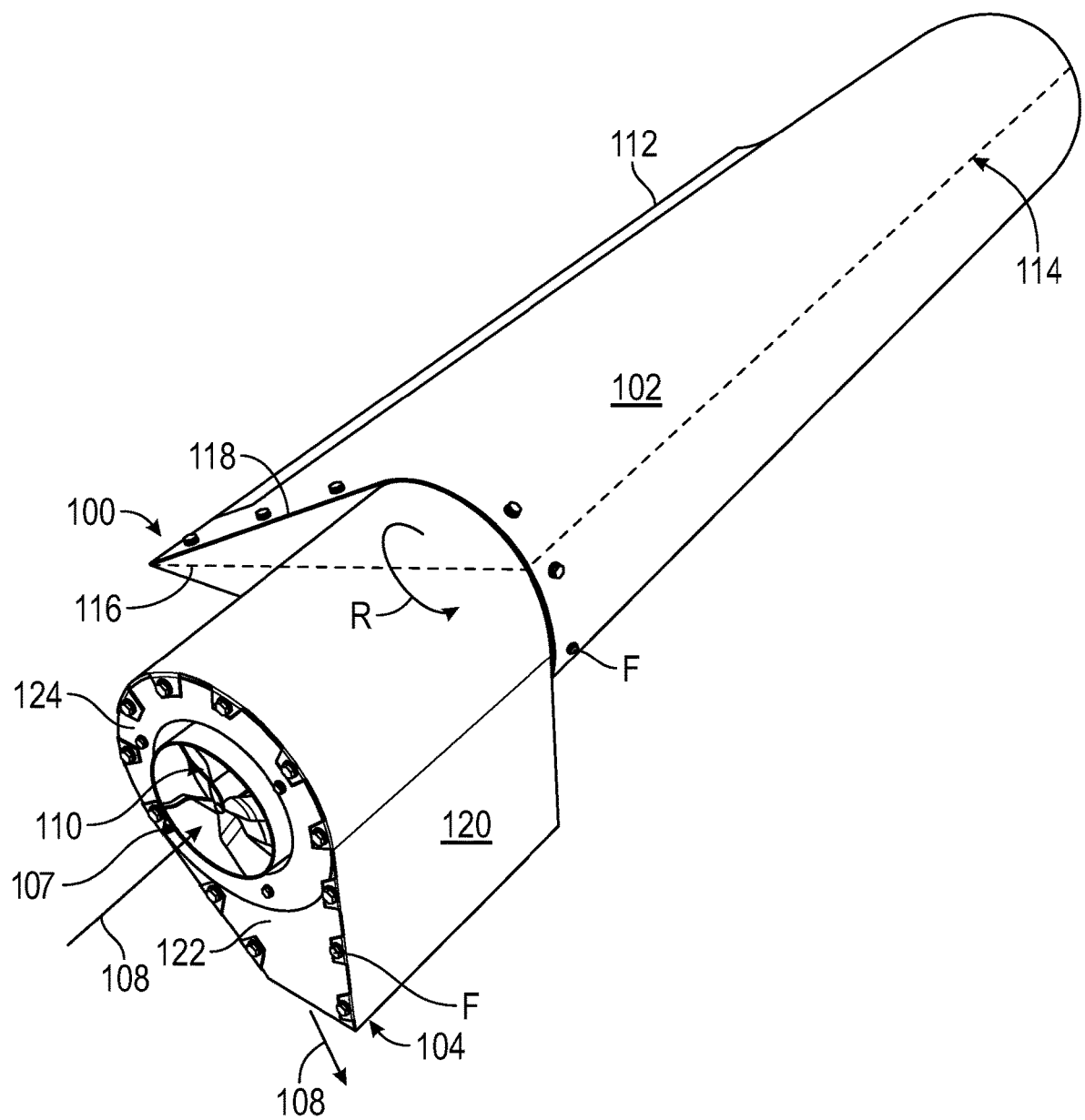
FIG. 2 shows a forward perspective view of the assembly of FIG. 1 wherein the nacelle has been rotated downward into a lift configuration.
Figure 3:
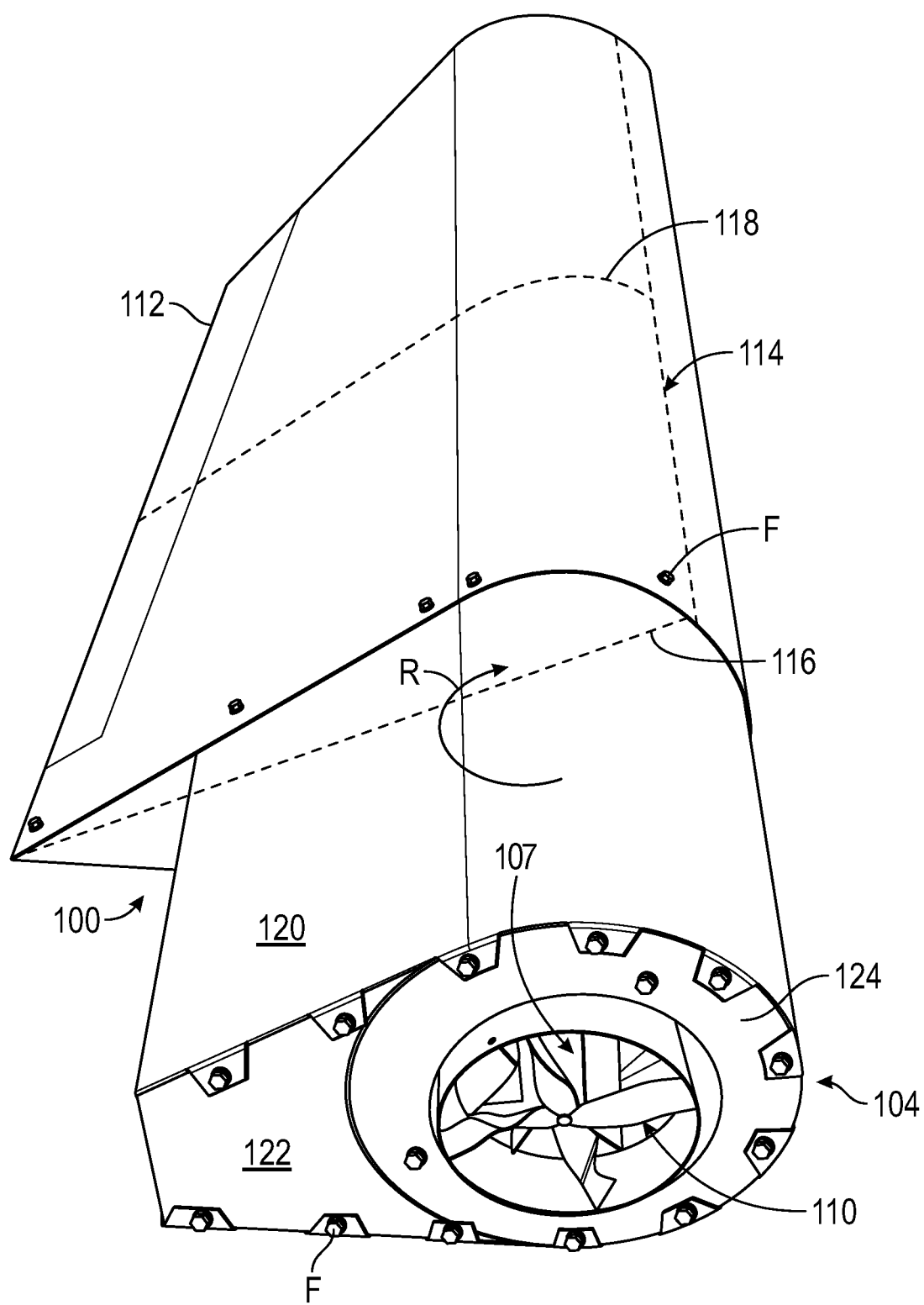
FIG. 3 shows an end perspective view of the assembly of FIG. 1 wherein the nacelle has been rotated back into a thrust configuration.

The wing 102 shown in the non-limiting example of FIGS. 2-3 includes at least (a) a sharp trailing edge cross-section 112, (b) a rounded leading edge cross-section 114, (c) dihedral, or a positive wing angle between the chord 116 and the horizontal, which increases spiral stability around the roll axis.

Optionally, the wing 102 can also include: (a) leading-edge devices such as slats, slots, or extensions, (b) trailing-edge devices such as flaps or flaperons (combination of flaps and ailerons, one such example being shown at the leading edge 112 of FIG. 2); (c) winglets to keep wingtip vortices from increasing drag and decreasing lift; and (d) other various devices, such as flaps or slats that the pilot uses to modify the shape and surface area of the wing to change its operating characteristics in flight, said flaps or slats including: (i) ailerons (usually near the wingtips) to roll the aircraft clockwise or counterclockwise about its long axis; (ii) spoilers on the upper surface to disrupt the lift and to provide additional traction to an aircraft that has just landed but is still moving; (iii) vortex generators mitigate flow separation at low speeds and high angles of attack, especially over control surfaces; (iv) wing fences to keep flow attached to the wing by stopping boundary layer separation from spreading roll direction; (v) folding wings allow more aircraft storage in the confined space of the hangar deck of an aircraft carrier; variable-sweep wing or "swing wings" that allow outstretched wings during low-speed flight (i.e., take-off and landing); (vi) strakes, which can sometimes improve flight characteristics; (vii) chine, which may blend into the wing; (viii) a leading-edge droop flap, which is a high-lift device; (ix) fairings, or other similar structures whose primary function is to produce a smooth outline and reduce drag; and (x) other minor independent aerodynamic surfaces.

The chord 116 is in essence the imaginary straight line joining the leading edge 114 and trailing edge 112 of the wing 102, with its length being the distance between the trailing edge 112 and the point where the chord intersects the leading edge. The point on the leading edge 114 used to define the chord may be either the surface point of minimum radius or the surface point that maximizes chord length. The chord of the wing 102 is thus used to described the width of the airfoil section(s) of the wing 102. The chord need not be one distance through the shape of the wing, but will be if the wing is uniformly shaped from the fuselage 128 to the tip of the wing 102, the chord will also be uniform through said 102. In wings that are not rectangular, different chords will thus exist at different positions. Usually, the chord length is greatest where the wing joins the aircraft's fuselage 128 (called the root chord) and decreases along the wing toward the wing's tip (the tip chord). The term chord can also be applied to the width of wing flaps, such as ailerons 142, elevators 144, and rudder(s) on an aircraft 98.

Figure 4:
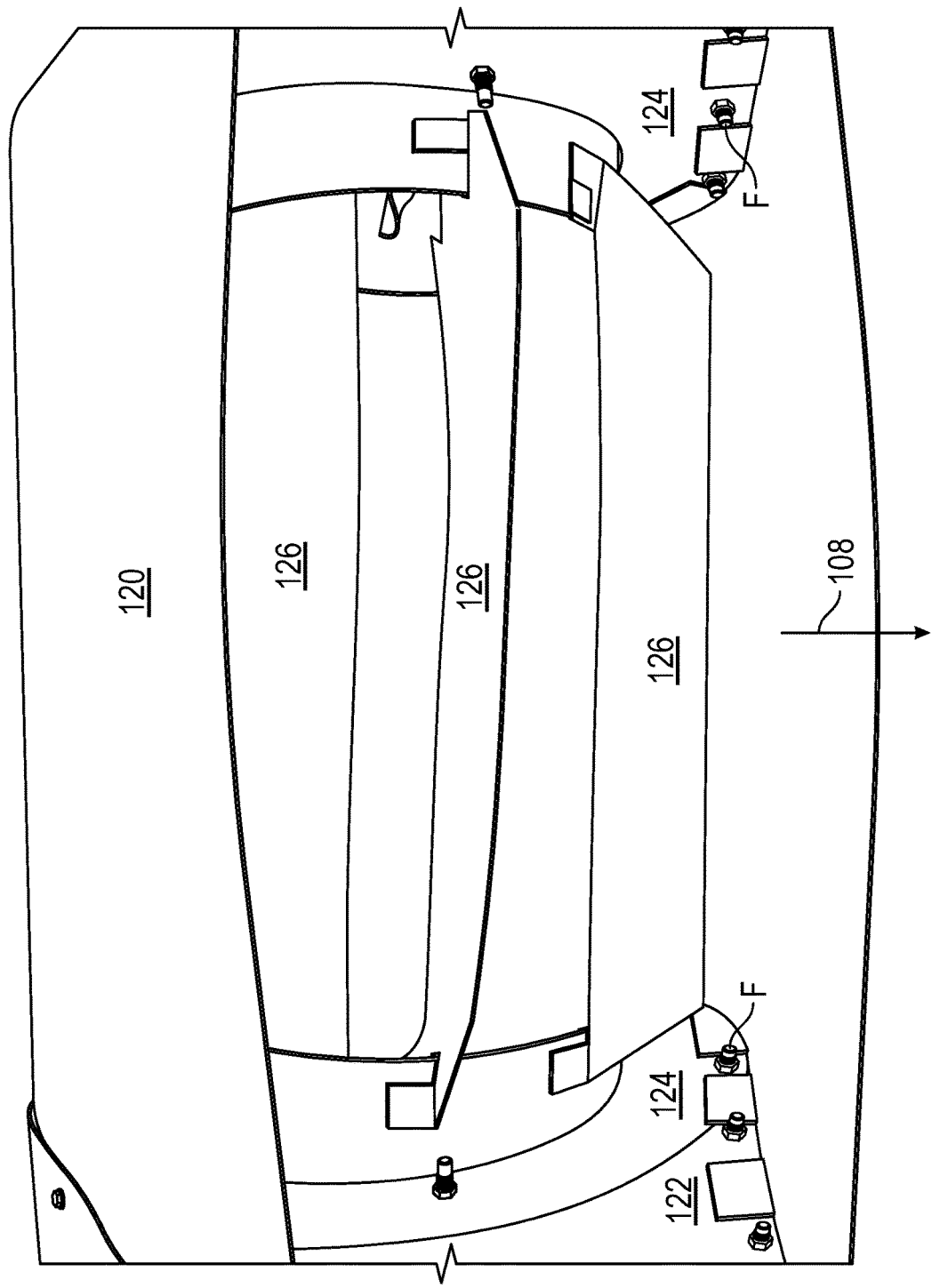
FIG. 4 shows a detailed, internal view of an impeller of the fan in the assembly of FIG. 1.

The camber 118 is in essence just the asymmetry between the upper and lower surfaces of the wing 102. The top surface of the wing 102 wing, and correspondingly the front surface of the curved impeller vanes 126 of FIG. 4, are shown having positive camber (convex). As mentioned previously, the camber 118 is ideally designed into an airfoil to maximize its lift coefficient. This minimizes the stalling speed of aircraft using the airfoil. An aircraft with cambered wings will have a lower stalling speed than an aircraft with a similar wing loading and symmetric airfoil wings. In some embodiments, the camber line 118 can be a reflexed camber line.

The nacelle 104 is shown as a housing formed by radial casing 120 and axial casing 122, though it is to be appreciated there also exists embodiments where the radial casing 120 and axial casing 122 simply form one integral casing. The nacelles 104 can be positioned a port end and a starboard end of the aircraft 98. Each nacelle 104 comprises an impeller casing 120, 122, a radial discharge nozzle 106 and an axial intake port 107, an impeller formed from blades or vanes 126 (optionally curved) housed within the impeller casing 120, 122. Operation (rotation) of the impeller will cause air to follow a flow path 108 into the impeller casing 120, 122, and swirl around said casing 120, 122 until exiting out of the radial discharge nozzle 106 in a substantially perpendicular direction (radial direction) to which the air entered the axial intake port 107. In said casing 120, 122, the fluid accelerates due to a centrifugal force caused by rotation R of the blades or vanes 126, which are mechanically connected to a rotor and motor of the aircraft (not shown), which could be located in fuselage 128. As shown, the axial intake port 107 can take in air in an axial direction from external location(s) near the tip of the wing 102. The radial discharge nozzle 106 can initially allow air to exit the aircraft 98 downwardly so as to create more lift (e.g. during takeoff), before being rotated along with the nacelle 104 to allow air to exit the aircraft 98 rearwardly to create more thrust (during cruise).

The nacelles 104 can also include a cowling 124 that is removable such that the blades or vanes 126 can be accessed without having to remove any other surfaces of the impeller casing 120, 122. The nacelles 104, cowling 124, radial and axial casings 120, 122, and even blades or vanes 126 can thus be removably attached to the wing 102 and/or other components of the nacelle 104 in a removable fashion, e.g. through fasteners F, to facilitate replacement and/or maintenance of same. Fasteners F should not impede rotation R of the nacelles 104.

Figure 5:
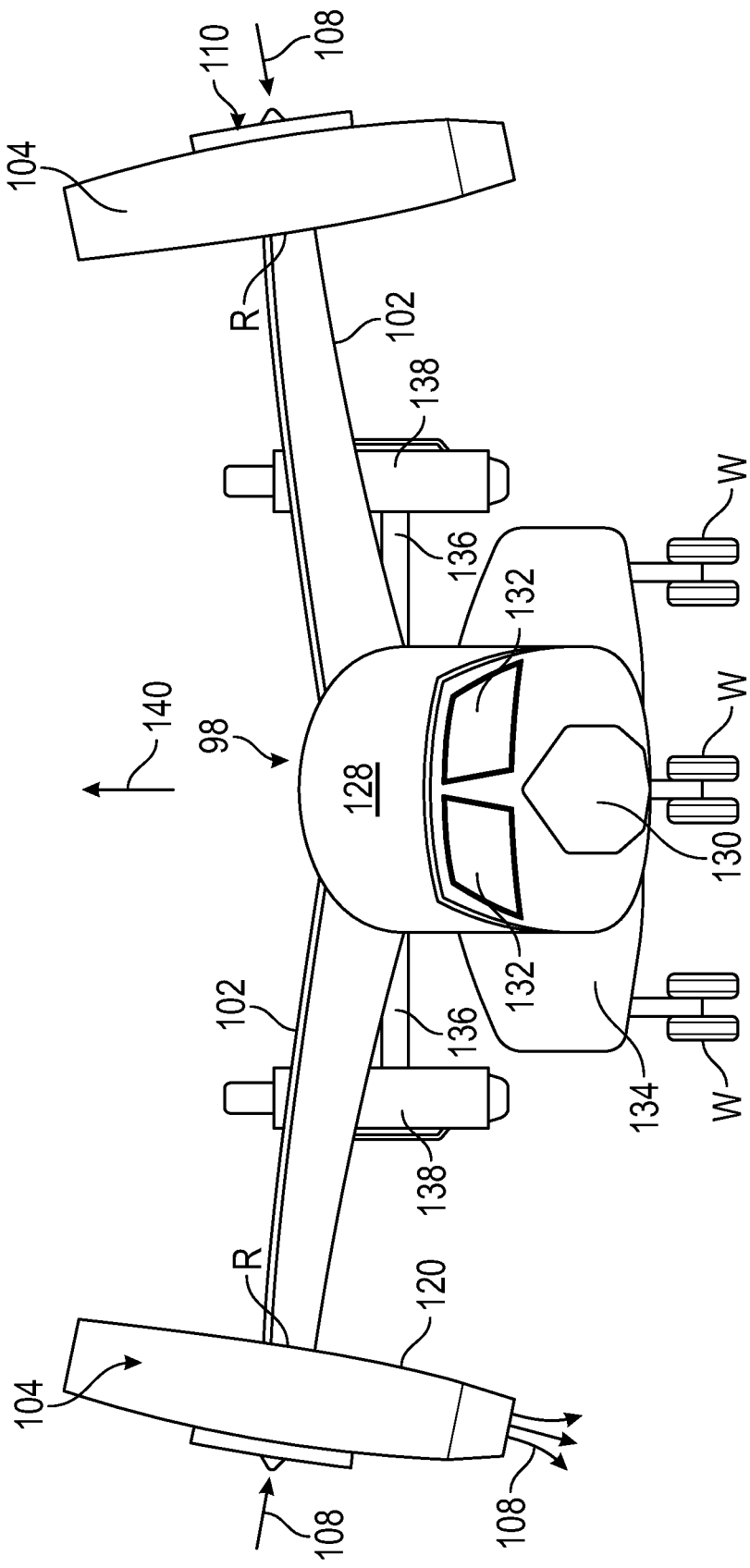
FIG. 5 shows a forward elevational view of an aircraft incorporating two of the assemblies shown in FIG. 1.
Figure 6:
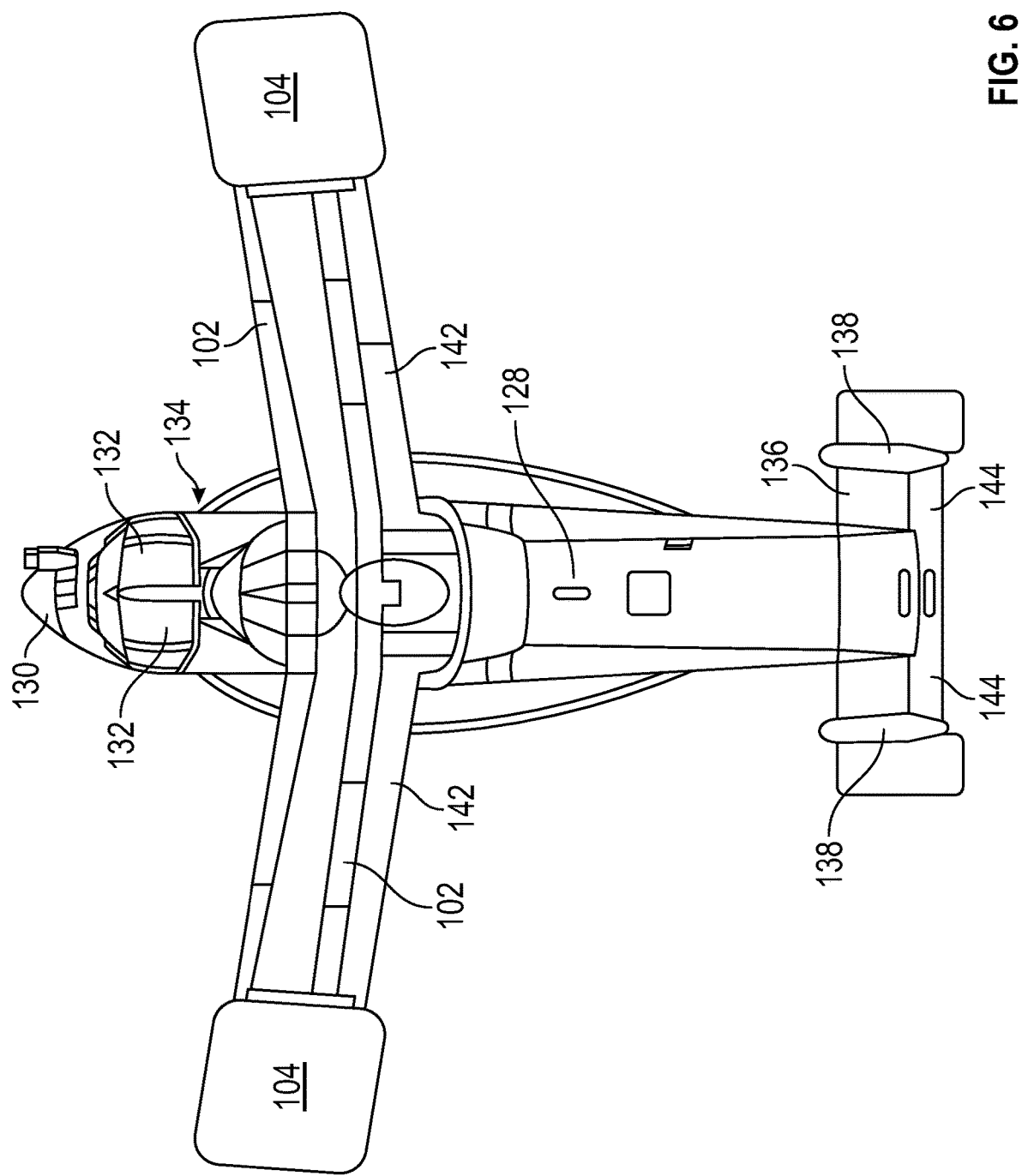
FIG. 6 shows a top elevational view of the aircraft of FIG. 5.

As shown in FIGS. 5-6, the aircraft 98 can comprise a fuselage 128 with a cockpit 134 having transparent windows 132 for visibility of persons within said cockpit 134. Furthermore, the cockpit 134 can be located adjacent a nose 130 of the aircraft 98 positioned at a foremost location of the fuselage 128.

Gyroscopes can also be included on the aircraft 98. For example, the gyroscopes can be positioned at end of the wings 102. The gyroscopes can act as attitude indicators, heading indicators, and turn coordinators (turn and slip indicator). The rotor or gyro can be electrically or vacuum driven and make use of the basic gyroscopic principles to display the attitude of the aircraft. Gyros can be constructed and fixed within the overall gyroscopic instrument by rings or gimbals to give the gyro certain motions of freedom. Laser gyroscopes can also be used.

Landing gear can be located at an undercarriage of the fuselage 128 with wheels W, said landing gear configured to facilitate takeoff and landing. For aircraft, the landing gear supports the craft when it is not flying, allowing it to take off, land, and taxi without damage. Wheeled landing gear is the most common with skis or floats needed to operate from snow/ice/water and skids for vertical operation on land. The landing gear can also retract during flight so as to reduce drag.

Various trim tabs can be employed to enhance the control and stability of the aircraft 98. For example: ailerons 142 can be located near the trailing edge 112; a tailplane 136 can attached to the aircraft 98 at an aftmost location of the fuselage 128 for horizontally stabilizing the aircraft 98; the tailplane 136 can comprise fins 138 that further stabilize the aircraft 98; and actuatable elevators 144 and/or rudders can be included on the tailplane 136 and/or wings 102 to help ease lifting and/or turning the aircraft 98.

Traditional avionics equipment, some of which can help control the aforementioned trim tabs, can be employed on aircraft 98. Examples of other types of avionics equipment includes are the electronic systems used on aircraft, artificial satellites, and spacecraft that handle communications, navigation, display and management of multiple systems of the aircraft 98. The avionics equipment likely includes hundreds of systems that are fitted to aircraft to perform individual functions. These can be as simple as a searchlight for a police helicopter or as complicated as the tactical system for an airborne early warning platform.

The aircrafts 98 described herein need not be manned, and can be semi- or fully-autonomous. For example, the aircrafts 98 can be drones, remote control (RC) model planes, and the like.

Aircraft ordnance can be included on the aircraft 98, where said aircraft 98 is used for military and/or policing specific applications.

Figure 7:
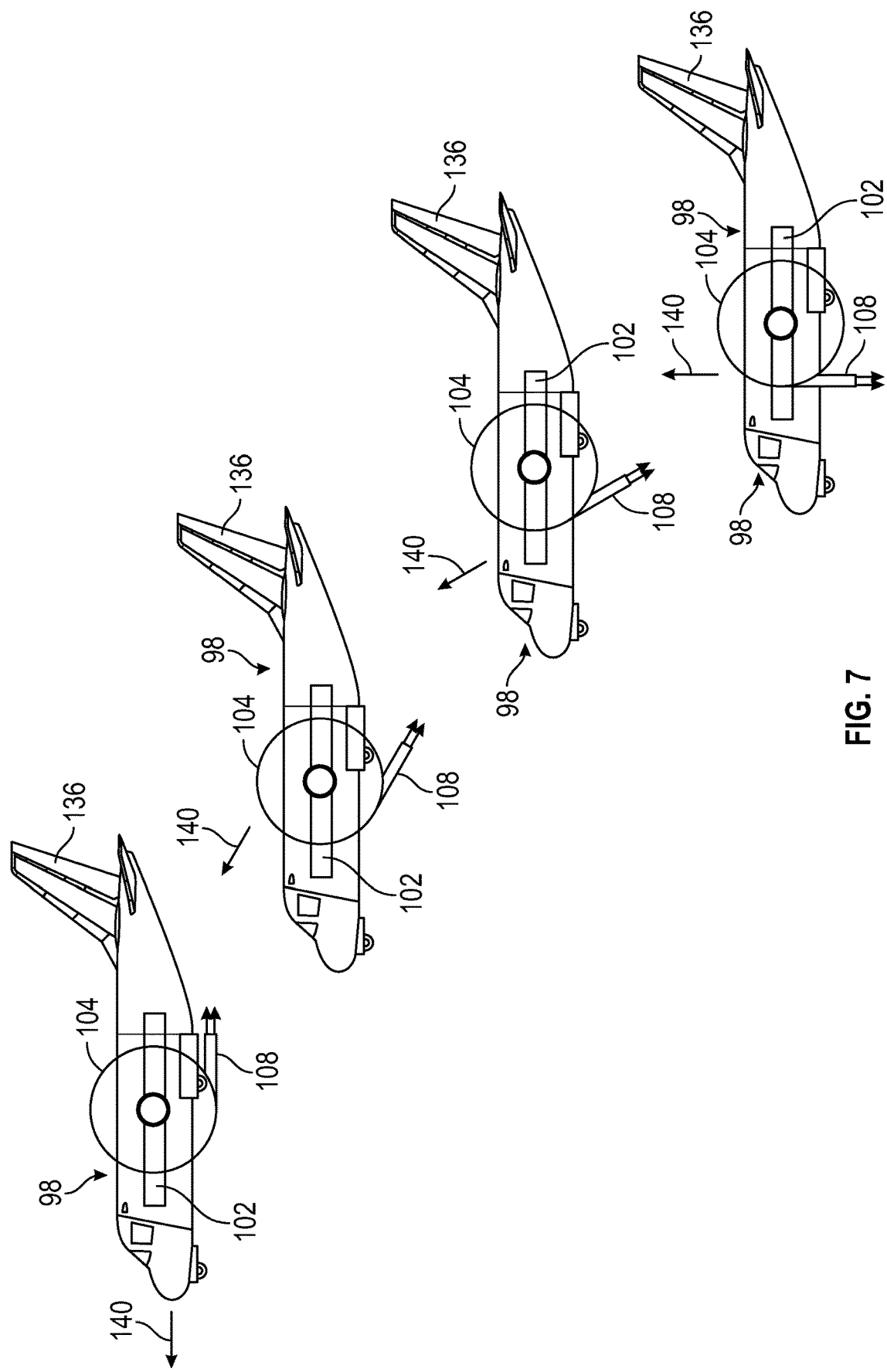
FIG. 7 shows an illustrative schematic view of an aircraft incorporating two of the assemblies shown in FIG. 1 transitioning from a lift configuration into a thrust configuration.

As particularly shown in FIG. 7, a method of providing lift and/or thrust 140 for the aircraft 98 can comprise utilizing the rotatable nacelles 104 at a port end and a starboard end of the wings 102 of the aircraft 98 to control the direction of air flow entering and exiting said nacelles 104. As power is delivered to the rotors from the motor, fluid is allowed to enter the nacelle 104 in a substantially axial direction through a centralized intake port locating on a sidewall 122 of the nacelle 104. The fluid (air) is then accelerated due to an apparent centrifugal force caused by rotation R of the rotors and the centripetal force caused by the housing of the nacelle 104. The fluid is then discharged through the outlet 106 formed in a circumferential wall 120 of the nacelle 104 in a substantially radial direction oriented approximately ninety degrees from the substantially axial direction.

The nacelle 104 is rotatable with respect to the wing 102 from a lift position wherein the discharge nozzle 106 is configured to discharge said fluid downward to a thrust position wherein the discharge nozzle 108 is configured to discharge said fluid aftward, with intermediate positions also being possible, as is particularly shown in FIG. 7.

Figure 8:
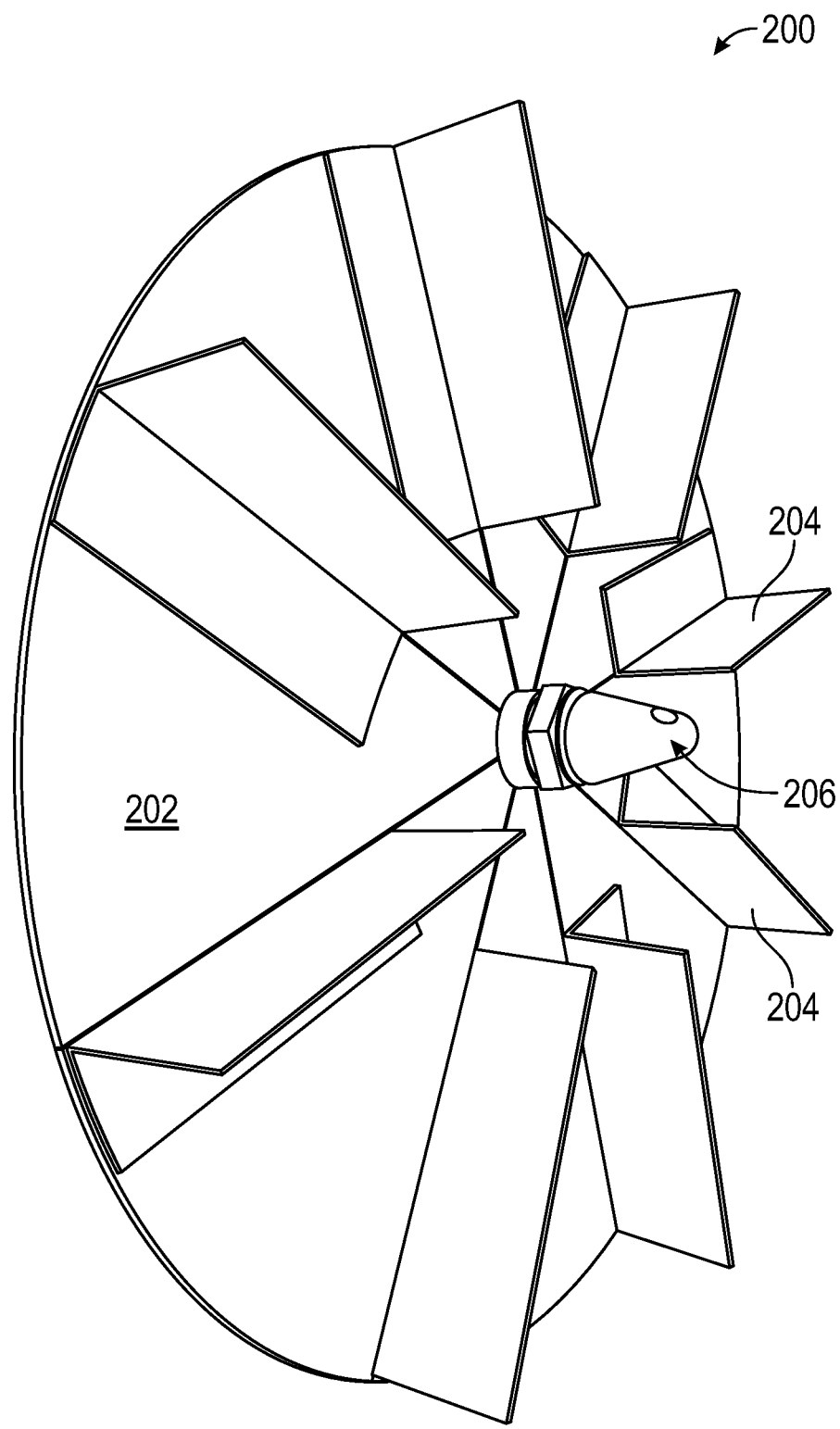
FIG. 8 shows a front perspective view of an alternative configuration for a fan and its impeller blades.

FIG. 8 shows an alternative design 200 for the fan 110 that is usable in more configurations than just the barrel type design shown throughout FIGS. 1-7. The alternative design 200 include a substantially circular fan plate 202 with blade 204 extending perpendicularly therefrom. The depth of the blades 204 can be varied depending on their application. The blades 204 are radially (also shown in a symmetric configuration, although one is not required) arrayed about a central hub 206.

Deeper blades 204 may be warranted where a higher volume of fluid is being pushed through the fan 200 and/or the rate at which fluid is entering the fan design 200 is very fast. Shallower blades 204 may be warranted where a smaller volume of fluid needs to be pushed and/or the rate at which air is entering the fan design 200 is slower. The type of fluid can also affect and/or determine optimal blade depth. The impeller of any fans described herein can include any number of blades/vanes, and in embodiments where an even number of blades/vanes are employed, can include opposing blades.

The central hub 206 can comprise a mechanical connection to the rotors of the aircraft 98 and/or electrical connections to wires and/or other aspects of the aircraft 98. The central hub 206 is preferably aerodynamically shaped.

It is to be appreciated aspects of the fan, wing, and nacelle assemblies 100 shown throughout FIGS. 1-7 will have application in nautical sciences generally, rather than just with aeronautics. One such example could be use of the alternative design 200 shown in FIG. 8 in connection with the marine industry, similar to the everglade style boats that have been constructed using airplane propellers. This type of boat is very noisy because of the super sonic speed of the propeller. Thus, use of a centrifugal fan such as those described herein can help reduce noise associated with these types of boats.

In such embodiments, instead of the wing 102, lifting structures used in water can include various foils, such as hydrofoils. Hydrodynamics is the governing science, rather than aerodynamics. Applications of underwater foils occur in hydroplanes, sailboats and submarines.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

List of Reference Characters

| | |
|---|---|
| 98 | aircraft |
| 100 | self-contained wing, fan and nacelle assembly |
| 102 | wing |
| 104 | rotatable nacelle |
| 106 | discharge nozzle |
| 108 | fluid path |
| 110 | fan |
| 112 | trailing edge |
| 114 | leading edge |
| 116 | chord |
| 118 | camber |
| 120 | radial casing, circumferential wall |
| 122 | axial casing, sidewall |
| 124 | cowling |
| 126 | curved vanes |
| 128 | fuselage |
| 130 | nose |
| 132 | windshield |
| 134 | cockpit |
| 136 | tailplane |
| 138 | fin |
| 140 | resultant force on aircraft |
| 142 | aileron |
| 144 | elevator |
| 200 | alternative design for fan |
| 202 | fan plate |
| 204 | blades |
| 206 | hub |
| F | fastener |
| R | point/direction of rotation |
| W | wheel |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially." The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

"Port" and "starboard" are nautical terms of orientation that deal with the structure of nautical vehicles, referring respectively to the left and right sides of the nautical vehicles, seen by an observer aboard the nautical vehicles looking forward. As used herein, any nautical terms usually reserved for marine vessels can similarly be applied to aircraft, unless their context denotes otherwise.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. An aircraft comprising:
    at least two wings extending symmetrically outward from a fuselage of the aircraft toward a port end and a starboard end; and
    an aileron located on a trailing edge of each wing;
    nacelles positioned the port end and the starboard end of the aircraft, each nacelle comprising:
        a fan with blades extending from a center of the fan toward a peripheral, annular member, said blades that twist and point at an angle to axially;
        an impeller casing having a radial discharge nozzle and an axial intake port located near the fan;
        an impeller housed within the impeller casing, said impeller comprising vanes (i) extending from an internal side of the impeller casing to an external side of the impeller casing, (ii) attached to the peripheral, annular member at the external side of the impeller casing, and (iii) having substantially axially oriented surfaces; and
        a cowling removable such that the vanes can be accessed without having to remove any other surfaces of the impeller casing;
    wherein operation of the impeller creates a flow path for a fluid wherein:
        the fluid enters the nacelles at the port end and the starboard end of the aircraft via the axial intake port in a substantially axial direction that is perpendicular to a rotational plane of the fan;
        the fluid accelerates due to a centrifugal force caused by rotation of the blades and the vanes; and
        the fluid exits the nacelle via the discharge nozzle in a substantially radial direction oriented approximately ninety degrees from the substantially axial direction; and
    wherein the nacelles are rotatable with respect to the wing from a lift position with the discharge nozzle configured to discharge the fluid downward to a thrust position with the discharge nozzle configured to discharge the fluid aftward.

2. The aircraft of claim 1, further comprising a tailplane attached to the aircraft at an aftmost location of the fuselage for horizontally stabilizing the aircraft.

3. The aircraft of claim 2, wherein the tailplane comprises at least one fin.

4. The aircraft of claim 3, wherein the at least one fin comprises an elevator.

5. The aircraft of claim 1, further comprising a cockpit with transparent windows for visibility, said cockpit located adjacent a nose positioned at a foremost location of the fuselage.

6. The aircraft of claim 1, further comprising a landing gear located at an undercarriage of the fuselage with wheels, said landing gear configured to facilitate takeoff and landing.

7. The aircraft of claim 1, wherein the aircraft is a remote control (RC) model plane.

8. The aircraft of claim 1, wherein the vanes of the impeller are positioned downstream on the flow path from the blades of the fan.

9. A method of providing lift and/or thrust for an aircraft comprising:
utilizing nacelles at a port end and a starboard end of wings of the aircraft, each nacelle comprising a fan with blades extending from a center of the fan toward a peripheral, annular member, said blades that twist and point at an angle to axially; a casing; a rotor housed within the casing that has vanes (i) extending from an internal side of the impeller casing to an external side of the impeller casing, (ii) attached to the peripheral, annular member at the external side of the impeller casing, and (iii) with substantially axially oriented surfaces; and a cowling removable such that the rotor housed within the casing can be accessed without having to remove any other surfaces of the casing;
powering the rotor with a motor;
allowing fluid to enter the nacelle at the port end and the starboard end of the wings of the aircraft (i) in a substantially axial direction that is perpendicular to a rotational plane of the fan and (ii) through a centralized intake port locating on a sidewall of the casing;
accelerating the fluid with a centrifugal force caused by rotation of the rotor; and
discharging the fluid through an outlet formed in a circumferential wall of the casing in a substantially radial direction oriented approximately ninety degrees from the substantially axial direction.

10. A self-contained assembly comprising:
a wing; and
a nacelle integrated at an end of the wing, the nacelle comprising:
a fan with blades extending from a center of the fan toward a peripheral, annular member, said blades that twist and point at an angle to axially;
a radial casing having a discharge nozzle;
an axial casing coupled to the radial casing having a centralized intake port;
an impeller comprising vanes (i) extending from an internal side of the impeller casing to an external side of the impeller casing, (ii) attached to the peripheral, annular member at the external side of the impeller casing, and (iii) having substantially axially oriented surfaces, said impeller enclosed within the radial casing and the axial casing; and
a cowling removable such that the vanes can be accessed without having to remove any other surfaces of the impeller casing;
wherein:
the discharge nozzle is configured to discharge fluid in a substantially radial direction;
the centralized intake port is configured to intake fluid at the end of the wing in a substantially axial direction that is perpendicular to a rotational plane of the fan;
the radial direction is substantially perpendicular to the axial direction; and
the nacelle is rotatable with respect to the wing from a lift position wherein the discharge nozzle is configured to discharge said fluid downward to a thrust position wherein the discharge nozzle is configured to discharge said fluid aftward.

11. The self-contained assembly of claim 10, wherein the radial casing and the axial casing are fully integrated into a singular component.

12. The self-contained assembly of claim 10, wherein the radial casing is fastened to the axial casing via fasteners.

* * * * *